US008497801B2

(12) United States Patent
Garin et al.

(10) Patent No.: US 8,497,801 B2
(45) Date of Patent: Jul. 30, 2013

(54) PREDICTION REFRESH METHOD FOR EPHEMERIS EXTENSIONS

(75) Inventors: Lionel Garin, Palo Alto, CA (US);
Pramod Gupta, San Jose, CA (US);
SaiPradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 12/025,252

(22) Filed: Feb. 4, 2008

(65) Prior Publication Data

US 2008/0186228 A1 Aug. 7, 2008

Related U.S. Application Data

(60) Provisional application No. 60/888,232, filed on Feb. 5, 2007.

(51) Int. Cl.
*G01S 19/27* (2010.01)
(52) U.S. Cl.
USPC .................................................. 342/357.66
(58) Field of Classification Search
USPC ........................................ 342/357.15, 357.66
See application file for complete search history.

(56) References Cited

U.S. PATENT DOCUMENTS

| 5,323,322 | A | 6/1994 | Mueller et al. |
| 5,430,657 | A | 7/1995 | Kyrtsos |
| 5,442,558 | A | 8/1995 | Kyrtsos et al. |
| 5,490,073 | A | 2/1996 | Kyrtsos |
| 5,621,646 | A * | 4/1997 | Enge et al. ............... 701/120 |
| 5,828,336 | A * | 10/1998 | Yunck et al. ............ 342/357.02 |
| 5,917,444 | A | 6/1999 | Loomis et al. |
| 6,016,117 | A | 1/2000 | Nelson, Jr. |
| 6,058,338 | A | 5/2000 | Agashe et al. |
| 6,064,336 | A | 5/2000 | Krasner |
| 6,075,987 | A | 6/2000 | Camp, Jr. et al. |
| 6,128,501 | A | 10/2000 | Ffoulkes-Jones |
| 6,211,819 | B1 | 4/2001 | King et al. |
| 6,222,483 | B1 | 4/2001 | Twitchell et al. |
| 6,225,945 | B1 | 5/2001 | Loomis |
| 6,285,315 | B1 | 9/2001 | Pratt |
| 6,313,787 | B1 | 11/2001 | King et al. |

(Continued)

FOREIGN PATENT DOCUMENTS

| EP | 1637900 A1 | 3/2006 |
| GB | 2271902 A | 4/1994 |

(Continued)

OTHER PUBLICATIONS

S.S. Russell et al., "Control Segment and User Performance", Navigation, vol. I, 1980, pp. 74-80.

(Continued)

*Primary Examiner* — Jack W Keith
*Assistant Examiner* — Cassie Galt
(74) *Attorney, Agent, or Firm* — Richard A. Bachand; Shyam K. Parekh; Mary A. Fales

(57) ABSTRACT

Systems, methods and devices for using ephemeris data in GNSS receivers and systems are provided. Receivers using synthetic ephemeris data for longer ephemeris availability under poor reception conditions are updated using a variety of techniques that allow for the transfer of accurate information onto degraded synthetic ephemeris information.

18 Claims, 2 Drawing Sheets

U.S. PATENT DOCUMENTS

| | | | |
|---|---|---|---|
| 6,323,803 B1 | 11/2001 | Jolley et al. | |
| 6,400,314 B1 | 6/2002 | Krasner | |
| 6,437,734 B1 | 8/2002 | McBurney et al. | |
| 6,487,499 B1 * | 11/2002 | Fuchs et al. | 701/213 |
| 6,510,387 B2 | 1/2003 | Fuchs et al. | |
| 6,529,830 B1 | 3/2003 | Eschenbach | |
| 6,542,820 B2 | 4/2003 | LaMance et al. | |
| 6,560,534 B2 | 5/2003 | Abraham et al. | |
| 6,567,712 B1 | 5/2003 | Rog et al. | |
| 6,587,789 B2 | 7/2003 | Van Diggelen | |
| 6,618,671 B2 | 9/2003 | Dooley et al. | |
| 6,642,884 B2 | 11/2003 | Bryant et al. | |
| 6,650,288 B1 | 11/2003 | Pitt et al. | |
| 6,651,000 B2 | 11/2003 | Van Diggelen et al. | |
| 6,670,915 B1 | 12/2003 | McBurney et al. | |
| 6,671,620 B1 | 12/2003 | Garin et al. | |
| 6,701,253 B2 | 3/2004 | Edwards et al. | |
| 6,704,651 B2 | 3/2004 | Van Diggelen | |
| 6,741,935 B1 * | 5/2004 | Eschenbach | 701/215 |
| 6,748,226 B1 * | 6/2004 | Wortham | 455/456.6 |
| 6,829,535 B2 | 12/2004 | Van Diggelen et al. | |
| 6,853,916 B2 | 2/2005 | Fuchs et al. | |
| 6,882,908 B2 | 4/2005 | Laurichesse | |
| 6,937,865 B1 | 8/2005 | Bloebaum et al. | |
| 6,958,726 B1 * | 10/2005 | Abraham et al. | 342/357.15 |
| 6,992,617 B2 * | 1/2006 | Diggelen et al. | 342/357.02 |
| 7,142,147 B2 | 11/2006 | Holly | |
| 7,142,157 B2 | 11/2006 | Garin et al. | |
| 7,342,533 B2 * | 3/2008 | Rotman et al. | 342/357.15 |
| 7,564,406 B2 | 7/2009 | Han | |
| 7,570,204 B1 | 8/2009 | McGraw | |
| 2002/0068997 A1 | 6/2002 | Agashe et al. | |
| 2002/0168985 A1 | 11/2002 | Zhao et al. | |
| 2002/0188403 A1 | 12/2002 | LaMance et al. | |
| 2002/0190898 A1 | 12/2002 | Abraham et al. | |
| 2004/0263386 A1 | 12/2004 | King et al. | |
| 2005/0250516 A1 | 11/2005 | Shim | |
| 2006/0036680 A1 | 2/2006 | Shim | |
| 2006/0181452 A1 * | 8/2006 | King et al. | 342/357.02 |
| 2007/0200752 A1 * | 8/2007 | van Diggelen et al. | 342/357.01 |
| 2007/0247354 A1 | 10/2007 | Garin | |
| 2007/0273581 A1 | 11/2007 | Garrison et al. | |
| 2007/0299609 A1 | 12/2007 | Garin et al. | |
| 2008/0186228 A1 | 8/2008 | Garin et al. | |
| 2009/0219206 A1 | 9/2009 | Garin | |
| 2012/0256792 A1 | 10/2012 | Garin | |

FOREIGN PATENT DOCUMENTS

| | | |
|---|---|---|
| GB | 2 380 343 A | 4/2003 |
| JP | 6201812 A | 7/1994 |
| JP | 07043446 | 2/1995 |
| JP | 2002536671 | 10/2002 |
| JP | 2003506719 A | 2/2003 |
| JP | 2004529032 A | 9/2004 |
| JP | 2005526225 | 9/2005 |
| JP | 2006084426 A | 3/2006 |
| JP | 2006525505 A | 11/2006 |
| JP | 2007292763 | 11/2007 |
| JP | 2008003092 | 1/2008 |
| JP | 2008513738 A | 5/2008 |
| JP | 2008145363 A | 6/2008 |
| JP | 2010509592 | 3/2010 |
| WO | WO0048017 | 8/2000 |
| WO | WO0116618 A1 | 3/2001 |
| WO | WO0221150 A2 | 3/2002 |
| WO | WO02099454 A2 | 12/2002 |
| WO | WO2004099813 A1 | 11/2004 |
| WO | WO2006031652 A2 | 3/2006 |
| WO | WO2006044976 A1 | 4/2006 |
| WO | WO 2007/099196 A1 | 9/2007 |

OTHER PUBLICATIONS

NAVSTAR Global Positioning System, Navstar GPS Space Segment/Navigation User Interfaces, Interface Specification IS-GPS-200, Revision D, IRN-200D-001, Mar. 7, 2006, p. 1-193.

L. Garin, et al., U.S. PTO Office Action, U.S. Appl. No. 11/738,656, Mar. 28, 2008, 18 pages.

L. Garin, et al., U.S. PTO Notice of Allowance and Fee(s) Due, U.S. Appl. No. 11/738,656, Nov. 24, 2008, 7 pages.

QUALCOMM Europe: "Positioning Enhancements for Wireless Assisted GPS Technology i n Release'00", 3GPP Draft; R2-001363, 3rd Generation Partnership Project (3GPP), Mobile Competence Centre ; 650, Route Des Lucioles ; F-06921 Sophia-Antipolis Cedex ; France, vol. Ran WG2, No. Paris, France; 20000630, Jun. 30, 2000, XP050115766, [retrieved on Jun. 30, 2000].

Paris, France; 20000630, Jun. 30, 2000, XP050115766, [retrieved on Jun. 30, 2000].

European Search Report—EP080151084—Search Authority—Munich—Jul. 10, 2008.

Hwang S., et al., "Analysis of Satellite Clock Correction for GPS/ WAAS User Pseudorange" Proc. of the 1997 National Technical Meeting of the ION, Jan. 14, 1997, pp. 921-927, XP002487776, Santa Monica, CA , USA * figure 1 ,pp. 921-923, section 2. "Formulation of the correction and Error".

Partial European Search Report—EP080151084—Search Authority—Munich—May 29, 2008.

ARINC Engineering Services, "Navstar GPS Space Segment Navigation User Interfaces", Navstar Global Positioning System, Interface Specification, IS-GPS-200, Revision D, ARINC Engineering Services, LLC, p. 127, Dec. 2004.

Daly et al., "GPS and Global Navigation Satellite System (GLONASS) in Global Positioning System", Theory and Applications, vol. 2, 1996, p. 243-255, 271-272.

\* cited by examiner

Position is computed using SAT 1 to SAT 4
SAT 5 Clock prediction is corrected

PREDICTION REFRESH METHOD FOR EPHEMERIS EXTENSIONS

CROSS REFERENCE TO RELATED APPLICATIONS

This application claims the benefit of U.S. Provisional Application 60/888,232 filed Feb. 5, 2007, entitled "Prediction Refresh Method For Ephemeris Extensions", the contents of which are hereby incorporated by reference.

SUMMARY OF THE INVENTION

Global Navigation Satellite Systems (GNSS) are currently in widespread commercial use. Such systems include or are projected to include the Global Positioning System (GPS), Galileo, Compass, GLONASS, DORIS and IRNSS.

GNSS receivers operate by storing data relating to the current and future positions and/or velocities of satellites in the system. Such data is often referred to as satellite ephemeris data. Satellite ephemeris data may be transferred to the receiver by the GNS Satellites themselves ("broadcast ephemeris"), or through some other communications link such as a wireless network or the Internet. Ephemeris data relating to future times are predictions whose accuracy degrades over time. It is therefore necessary to update GNSS receivers with new ephemeris data periodically.

In some cases, it is difficult for GNSS receivers to receive ephemeris data from a GNSS satellite or other communications system. This may happen, for example, where the GNSS receiver does not have access to a wireless network, and is shielded from satellite reception by buildings or other obstacles. In such situations, it is useful to be able to slow the degradation of ephemeris data, such that the data can be used by a receiver for longer periods between data updates.

Thus, there is currently a need for Ephemeris Extension techniques in the GNSS industry. The potential advantages are that there would be no need to wait for the broadcast ephemeris before a position is computed. The best case time for receiving broadcast ephemeris is 30 seconds with high signal strengths, or never in a worst case indoor environment.

Currently, the state of the art allows for ephemeris predictions that are accurate enough to be useful for between 3 days and 7 days. There is an incentive to increase the limits of the prediction usability for ease of use by the end user and to decrease accesses of the prediction server.

One difficulty is that the Ephemeris Extension accuracy degrades as the prediction age increases. The prediction is generally composed of 2 elements, satellite position prediction and clock prediction.

The satellite position prediction error is usually split for convenience into three subcategories of errors, related to a local reference frame attached to the orbit of the satellite, Radial error, along track (down track) error and cross-track error. Each one of these errors has a different behavior with the age of the prediction, and impacts the user position in different ways.

Typically for force model prediction algorithms, the errors behave as follows: (1) the along track/down track error increases according to a square law vs. age of the prediction; (2) the radial error increases linearly with the age of prediction; (3) the cross track error increases linearly with the age of prediction; and (4) the Clock error increases according to the square of the age of the prediction.

Thus, the dominant source of error is the clock error as soon as the prediction duration reaches 7 days. The satellite position error is much less of a problem, as the force models are very sophisticated, and obey well-known (albeit complex) physical models. Up to some point, the satellite position error can be carefully controlled over a longer prediction period by increasing the complexity of the force models.

In contrast, the clock models are very rudimentary, as clock error approaches a true random phenomenon that cannot be modeled well beyond the general tendency model of offset and drift. In particular, the random walk effect and the flicker effects are not predictable.

Currently there is no known clock prediction method that reliably works beyond one week. The satellite position prediction (at least the radial component) can be quite good. Thus, there is currently a need to mitigate the limitations of the clock prediction by using partial refreshes.

The presently disclosed embodiments allow a correction to ephemeris prediction based on newer data about combined satellite clock correction and satellite position error. Preferred embodiments of the present invention allow a position update where all error is attributed to the clock, assuming the satellite position prediction accurate.

Additional embodiments of the invention describe refresh of the position data, which is more difficult to implement, as the orbital elements are consistent between themselves, but not across different curve fits. One of the difficulties is that one cannot substitute a single orbital element (OE) from a variation of elements type prediction file such as that disclosed in provisional application 60/815,838, entitled "METHOD AND SYSTEM FOR EPHEMERIS EXTENSION FOR GNSS APPLICATIONS", filed Jun. 23, 2006, now U.S. Patent Application 11/812957, filed Jun. 22, 2007, herein incorporated by reference, by the equivalent OE from broadcast ephemeris; as they are not issued from the same curve fitting operation, and thus incompatible. The only position refresh method possible would be to revert back to the satellite positions, and redo curve fitting and recompaction in the client (GNSS receiver) code. Usually the client code is limited in size and computing power and cannot be sophisticated enough to do curve fitting to blend old predictions and new predictions.

DESCRIPTION OF THE PREFERRED EMBODIMENTS

Figure 1:
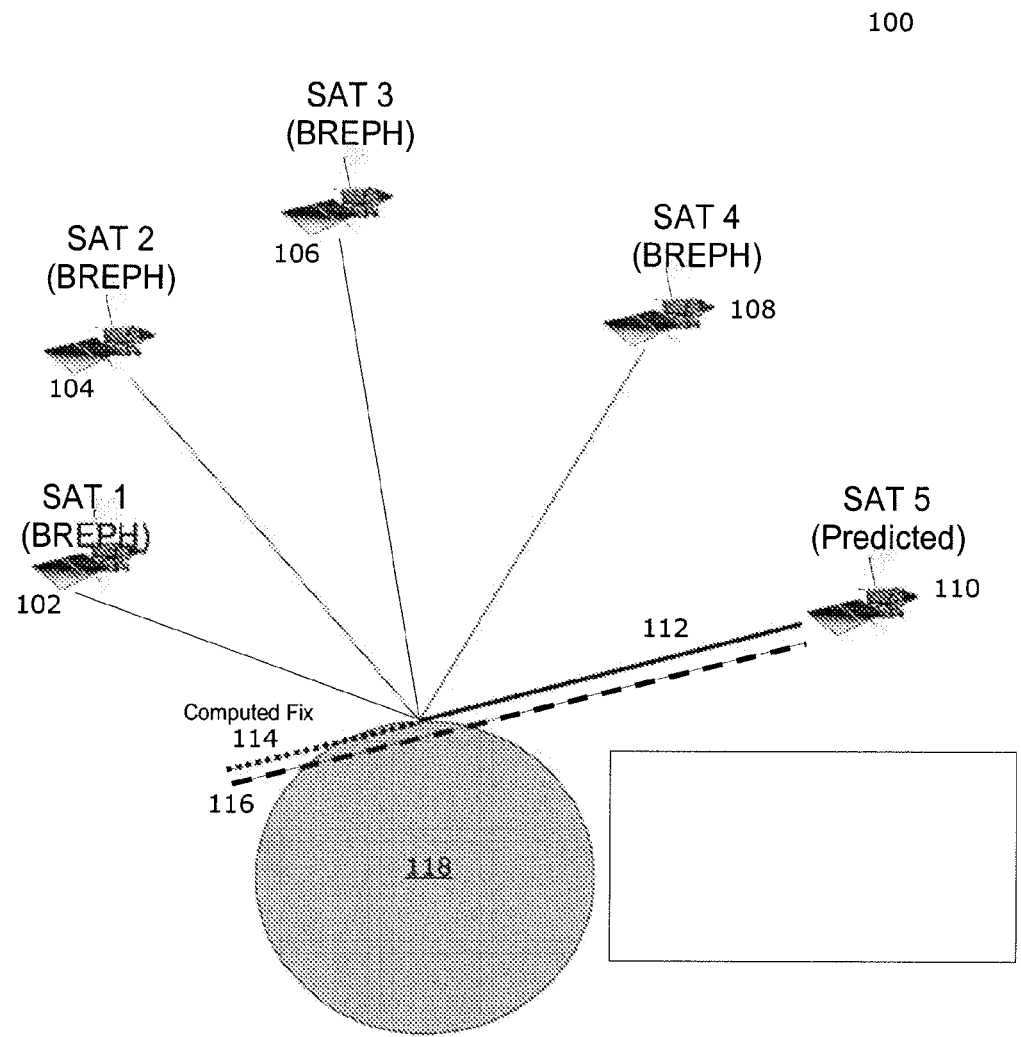
FIG. 1 illustrates steps of a method embodiment of the invention.

The present description will refer to ephemeris data received from GNSS satellites as "broadcast" ephemeris data and ephemeris data predicted but not broadcast by GNSS satellites as part of a navigation message as "synthetic" ephemeris or prediction data. The term "extended" may also be used to refer to synthetic ephemeris data with an extended period of accuracy.

A refresh method embodiment of the present invention is accomplished in 4 steps, described below.

(1)—Collection of information for the satellite to correct;
(2)—Validation of a prediction and determining if refresh is necessary;
(3)—Estimation of the clock correction and possibly clock drift (possibly using other satellites information);
(4)—Combination of the refreshed clock correction and the extended prediction information.

Step 1:

Depending on the type of correction, the collected information can be Broadcast Ephemeris, one or more pseudo range measurements or delay range measurements, or any combination thereof.

There is no particular way to get measurements for the satellites, except that a previously computed prediction can be used as a priori information to speed up the acquisition of the satellite to correct, similar to what is done with the ephemeris in the traditional way. The code offset/Doppler search domain will have to be increased depending on the age and therefore accuracy of the predictions.

Step 2:

If at some point during the synthetic prediction interval, broadcast ephemeris is available for all satellites in the synthetic prediction or for a subset of the satellites, it is possible to validate the position and clock predictions. One method of revalidation is to perform statistical analysis of the clock and position differences between broadcast ephemeris and synthetic ephemeris and verify if the differences pass predefined criteria for acceptability. The statistical analyses may include but are not limited to the following techniques: hypothesis testing, tests for normality, distribution fitting etc. If the outcome of one or more of these analyses indicates a need for ephemeris refresh, then the techniques outlined in the following steps of this document can be implemented.

Step 3:

Step 3 may be carried out using several different methods, labeled herein as methods A-C.

Method A—One broadcast ephemeris data set for satellite N combined with one synthetic ephemeris data set for satellite N yields one refreshed extended data set for satellite N. Herein satellite N refers to an arbitrary satellite in the satellite constellation of the particular GNS system.

The toc, af0 and af1 terms defined in ICD 200 are "lifted" from the broadcast ephemeris data, and are used "as is" in step 3.

This method can be used even if not enough satellites are visible for a position computation, if the one to correct is strong enough to get full broadcast ephemeris data with no transmission errors.

Method B Method B uses a mix of broadcast/synthesized ephemeris (satellite 1 to satellite N), together with related pseudo ranges or delta ranges (satellite 1 to satellite N), predicted ephemeris for sat N+1 and pseudorange for satellite N+1 to yield refreshed extended ephemeris for satellite N+1.

An exemplary algorithm can be described as below.

(1) Position fix. Compute a position fix from all satellites with measurements and a satellite position prediction available (broadcast ephemeris or synthetic ephemeris). The relative weight of each measurement is adjusted according to the a priori knowledge of the associated prediction accuracy. An estimate of the position accuracy is also computed to be used in the next phase.

(2) Theoretical PR Computation. For each satellite used in the fix, but with only synthetic ephemeris and pseudorange available, compute the theoretical pseudorange from the predicted satellite position and clock correction at the time of the transmission to the computed receiver position.

(3) Compute clock correction at the time of the fix. The predicted satellite position used in step (2) is considered more accurate than the clock prediction.

We assume that the difference between theoretical pseudorange and measured pseudorange is only due to the satellite clock error. The difference between the measured pseudorange and the calculated one is the correction to be applied on the predicted satellite clock correction to get a more accurate clock correction prediction. The clock correction uncertainty is estimated from the position uncertainty and the pseudorange measurement uncertainty.

FIG. 1 illustrates a simplified case in a GNS system 100 where the position of a receiver on the Earth 118 is computed using only the satellites with available broadcast ephemeris (satellites 102 to 108), and wherein the receiver has synthetic ephemeris for satellite 110. A pseudorange 116 (shown by the dashed line) is measured for satellite 110, which because of the error in the synthetic ephemeris results in a poor position. The receiver then uses the position fix and the synthetic ephemeris to produce an expected pseudorange 112 (solid line), which is compared with the actual pseudorange measurement. The error 114 (dotted line) is attributed to the clock error. Only the satellite 110 clock correction in the synthetic ephemeris will be recalibrated.

In a generalized implementation, all satellites will be used for fix computation, and all satellites with only synthetic ephemeris will be corrected. In the extreme case, we might have all satellites in the fix with only synthetic ephemeris.

The clock and position information for the satellites 1 to N is used to correct the clock correction of the satellite N+1 for which we have no direct clock information. Only the consistency of the solution is considered here (i.e. the assumption that the pseudorange residual from the considered satellite to the calculated receiver position is zero).

The same method can be applied to the delta range measurements, satellite velocity predictions, to obtain a satellite (N+1) clock drift correction estimate along with an accuracy estimate of the correction.

This technique can be systematically applied every time a fix is made and will average out the clock predictions errors between satellites (offset and drift alike).

Method C. Method C uses the receiver position in combination with the broadcast ephemeris for satellite 2, psuedorange/delta range for satellite 2, synthetic ephemeris for satellite 1 and psuedorange/delta range for satellite 1 to yield refreshed synthetic ephemeris for the satellite 1 clock offset (clock drift).

The a priori knowledge of the receiver position by other means than GPS can be used to "transfer" the good clock knowledge of a satellite 2 onto a satellite 1.

It is similar to a code single differencing technique, but here we are using the psuedorange single difference for different satellites to the same receiver. The usual single difference technique is doing pseudorange differencing for the same satellite to different receivers.

Figure 2:
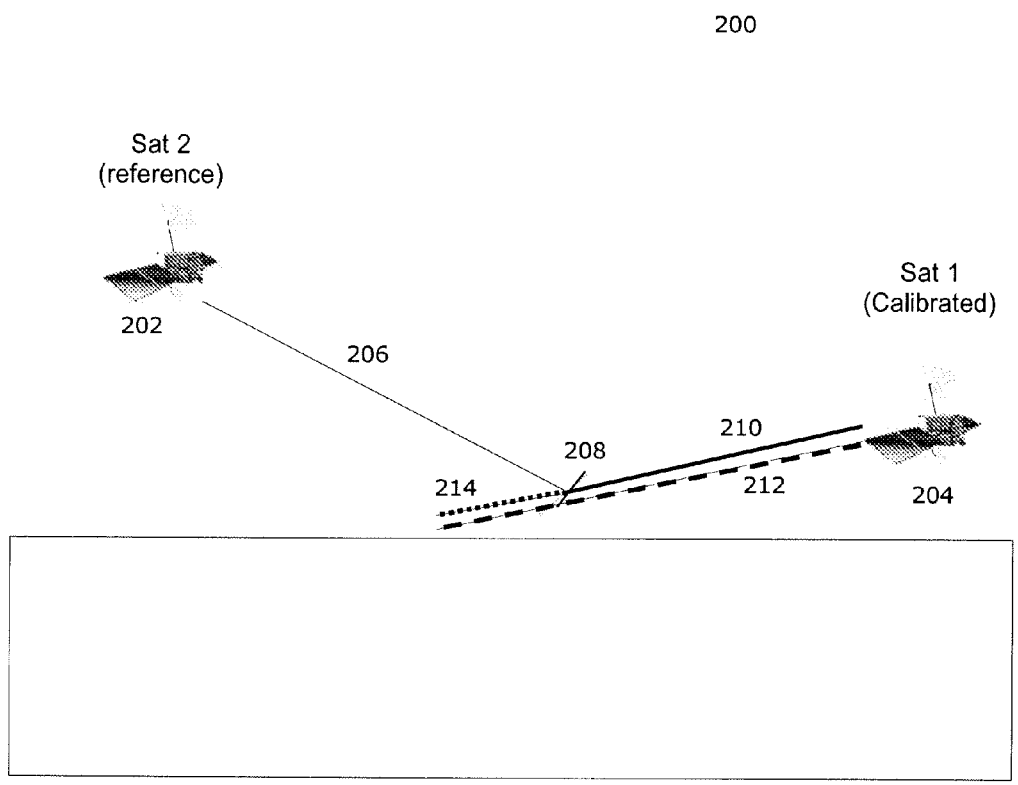
FIG. 2 illustrates steps of another method embodiment of the invention.

The method C is illustrated in FIG. 2, which shows a GNS system 200 with a receiver on road track 208, receiving signals from satellites 202 (satellite 2) and 204 (satellite 1). Satellite 202 is broadcasting signals which allow the receiver, having a priori knowledge of its location, to form an accurate range 206 and measure a pseudorange. A pseudorange 212 (shown by the dashed line) is also measured from satellite 204, having an error component 214 (dotted line). The pseudoranges can then be differenced as described below and solved for an estimate of the clock correction.

A simple mathematical formula shows how pseudoranges for satellites 1 and 2 (denoted by superscripts which do not indicate powers) are expressed as ranges plus a number of contributing errors:

$$\rho_r^1 = r_r^1 + I_r^1 + T_r^1 + c \cdot (\partial t_r - \partial t^1) + \epsilon_r^1$$

$$\rho_r^2 = r_r^2 + I_r^2 + T_r^2 + c \cdot (\partial t_r - \partial t^2) + \epsilon_r^2$$

The single difference is expressed as:

$$\Delta \rho_r^{12} = (r_r^1 - r_r^2) + (I_r^1 - I_r^2) + (T_r^1 - T_r^2) + c \cdot (\partial t^2 - \partial t^1) + (\epsilon_r^1 - \epsilon_r^2)$$

If the following is known:

a)—$\Delta\partial_r^{12}$ Pseudorange single difference b)—$(I_r^1 - I_r^2)$ Ionospheric differences (they do not cancel out, but can be modeled);

c)—$(T_r^1 - T_r^2)$ Tropospheric differences (they do not cancel out, but can be modeled);

d)—$\partial t^2$ Satellite 2 clock correction from the satellite 2 broadcast ephemeris;

e)—$r_r^2$ Geometric distance from satellite 2 to receiver location (from Broadcast Ephemeris and known receiver location);

f)—$r_r^1$ Geometric distance from satellite 1 to receiver location (from deemed precise satellite 1 predicted position to known receiver location).

One can estimate the clock correction (af0 term) for the satellite 1 at the time of the fix:

$$\partial t^1 \approx 1/c[-\Delta\rho_r^{12} + (r_r^1 - r_r^2) + (I_r^1 - I_r^2) + (T_r^1 - T_r^2) + c \cdot \partial t^2]$$

The same technique can be applied on the single delta range difference to estimate the drift (af1 term).

This technique is relatively insensitive to the transmit/receive time uncertainty, as the geometric range difference between satellites slowly evolves. It is possible to not calibrate the receiver clock error (by computing a fix, for example) to apply this technique, even if the real time clock (RTC) is off from system time by several seconds.

If the system time is accurately known (significantly sub microsecond absolute time), and the position is accurately known, one can recalibrate the satellite 1 clock correction even without information and measurements for another satellite.

Submethod C1—Position on a road segment. If a GNSS receiver is used with a map matching engine, the position and velocities computed with a fix using synthetic ephemeris can be projected onto the map to unambiguously determine on which road segment the receiver is on. A "range" of geometrical range differences between satellites can be computed, and the satellite 2 correction can be measured against the satellite 1 precise information. The variation of the geometrical range difference is added to the uncertainty of the clock correction determination. A short road segment will not impact the clock correction accuracy very much. Similarly, a road segment, perpendicular to the plane defined by satellite 1 position, satellite 2 position, and the Earth's center will add no error to the clock correction estimation.

Submethod C2—Position from another technique (cell based location technique, WiFi, . . . etc). The technique delineated earlier for a map matching engine can also be applied to any technique that can deliver a receiver position, the uncertainty on this position will directly add up to the clock correction uncertainty.

Step 4:

The correction information can be stored at the client (receiver) side in several ways:

Option 1: The newly collected information is used to modify the structure of the synthetic ephemeris file. This minimizes the NVRAM code, and implies that the client code is clever enough to do this compaction operation on the fly.

Option 2: Another method is to reserve a section of the NVRAM (aside from the synthetic ephemeris file storage area), and to store there the "corrections" or substitutions of some data present in the synthetic ephemeris file. During the decompaction of the synthetic ephemeris file, the extra information will be added on top of the synthetic ephemeris approximation. This can take the form of a correction table, or an extra approximation to be added on top of the ones already in the synthetic ephemeris file. This second method is the one preferred.

The combination of new clock information with the existing clock information is another issue. The information from the measurements will be at worst only the clock correction, and at best clock correction and clock drift correction. This is only a first order approximation around the reference time, whereas the synthetic ephemeris correction is usually a second order with harmonic terms.

Two methods can be applied here:

(1) Translation of the predicted clock approximation. The constant offset in the clock polynomial correction method is adjusted to match the one measured at the reference time.

(2) Translation and scale correction. Clock offset and first order are adjusted to fit the approximation.

For these two methods, the fusion of information from two different sources must be made according to the relative a priori accuracy attached to each one.

System Operation

The steps of operation of a system employing methods described herein is described now in an exemplary fashion.

(1) Synthetic ephemeris download. The user downloads the most recent synthetic ephemeris file from the server at the time of the download (via the Internet during docking or with a wireless connection).

(2) Synthetic ephemeris file usage. During the validity period of the synthetic ephemeris file, a position fix is attempted.

(3) Broadcast download. The reception conditions are sufficient to collect several broadcast ephemeris data sets current at the time of the fix. The fix will probably be computed using synthetic ephemeris only data for the first 30 seconds, and then a mix of synthetic ephemeris predicted data (for the measurements without broadcast data available) and broadcast data (always higher priority over synthetic ephemeris when available).

(4) Synthetic ephemeris refresh phase. During or just after the positioning session, the client uses the extra information from the broadcast data and updates the synthetic ephemeris file information, according to embodiments of the present invention.

(5) Use of synthetic ephemeris refreshed data. At the next positioning session, the synthetic ephemeris data will have been "refreshed" and the quality (i.e. accuracy) of the synthetic ephemeris only fixes and mixed fixes will be improved.

One system can be implemented using a server operating as or in communication with a computing platform for generating synthetic ephemeris prediction files. These files can be based on information from satellite tracking systems as is known in the art. The prediction files can be broadcast by a variety of communication links including wireless and landline based Internet channels to a GNSS receiver of a user. The user's GNSS receiver may be a combination of processing devices or a single processing device, equipped with hardwired logic or programmable circuitry capable of carrying the algorithms as disclosed herein.

What is claimed is:

1. A method comprising:

obtaining, by an end user GNSS receiver, a broadcast ephemeris data set associated with a GNSS;

obtaining, by the end user GNSS receiver, a current position;

measuring, by the end user GNSS receiver, a range to a first satellite to obtain a first pseudorange;

calculating, by the end user GNSS receiver, based on a synthetic ephemeris data set for a second satellite, a range to the second satellite to obtain a second pseudorange;

attributing, by the end user GNSS receiver, error in the second pseudorange only to clock error in the synthetic ephemeris data set; and determining, by the end user GNSS receiver, a clock correction for the synthetic ephemeris data set based, at least in part, on a difference-based relationship associated with the first pseudorange and the second pseudorange.

2. The method of claim 1, wherein determining the clock correction is further based, at least in part, on a position estimate obtained from a non-GNSS source.

3. The method of claim 2, wherein the non-GNSS source comprises a map-matching engine.

4. The method of claim 2, wherein the non-GNSS source comprises a communication network.

5. An apparatus comprising:
a receiver section configured to receive GNSS signals; and
a processor configured to:
   obtain a broadcast ephemeris data set associated with a GNSS;
   obtain a current position;
   measure a range to a first satellite to obtain a first pseudorange;
   calculate, based on a synthetic ephemeris data set for a second satellite, a range to the second satellite to obtain a second pseudorange;
   attribute error in the second pseudorange only to clock error in the synthetic ephermeris data set; and
   determine a clock correction for the synthetic ephemeris data set based, at least in part, on a difference-based relationship associated with the first pseudorange and the second pseudorange.

6. An apparatus comprising:
means for obtaining a broadcast ephemeris data set associated with a GNSS;
means for obtaining a current position;
means for measuring a range to a first satellite to obtain a first pseudorange;
means for calculating, based on a synthetic ephemeris data set for a second satellite, a range to the second satellite to obtain a second pseudorange;
means for attributing error in the second pseudorange only to a clock error in the synthetic ephemeris data set; and
means for determining a clock correction for the synthetic ephemeris data set based, at least in part, on a difference-based relationship associated with the first pseudorange and the second pseudorange.

7. The apparatus of claim 6, wherein the clock correction is determined further based, at least in part, on a position estimate obtained from a non-GNSS source.

8. The apparatus of claim 7, wherein the non-GNSS source comprises a map-matching engine.

9. The apparatus of claim 7, wherein the non-GNSS source comprises a communication network.

10. The method of claim 1, wherein the difference-based relationship includes an ionospheric difference.

11. The method of claim 1, wherein the difference-based relationship includes a tropospheric difference.

12. The method of claim 1, wherein the difference-based relationship includes a geometric range difference.

13. The apparatus of claim 5, wherein the difference-based relationship includes an ionospheric difference.

14. The apparatus of claim 5, wherein the difference-based relationship includes a tropospheric difference.

15. The apparatus of claim 5, wherein the difference-based relationship includes a geometric range difference.

16. The apparatus of claim 6, wherein the difference-based relationship includes an ionospheric difference.

17. The apparatus of claim 6, wherein the difference-based relationship includes a tropospheric difference.

18. The apparatus of claim 6, wherein the difference-based relationship includes a geometric range difference.

* * * * *